US012769863B2

(12) United States Patent
Kurian et al.

(10) Patent No.: US 12,769,863 B2
(45) Date of Patent: Oct. 20, 2026

(54) DATA GOVERNANCE AI FOR PREDICTIVE DATA RETRIEVAL BASED ON MULTIPLE TRIGGERS

(71) Applicant: Bank of America Corporation, Charlotte, NC (US)

(72) Inventors: Manu Kurian, Dallas, TX (US); Freddy Cabrera, Matthews, NC (US); Paul Grayson Roscoe, Treuddyn (GB); Harold Kennedy, Winter Park, FL (US)

(73) Assignee: Bank of America Corporation, Charlotte, NC (US)

( * ) Notice: Subject to any disclaimer, the term of this patent is extended or adjusted under 35 U.S.C. 154(b) by 8 days.

(21) Appl. No.: 18/970,199

(22) Filed: Dec. 5, 2024

(65) Prior Publication Data

US 2026/0161812 A1 Jun. 11, 2026

(51) Int. Cl.
*G06F 21/62* (2013.01)
*H04L 9/40* (2022.01)

(52) U.S. Cl.
CPC ........ *G06F 21/6218* (2013.01); *H04L 63/107* (2013.01)

(58) Field of Classification Search
CPC ........................... G06F 21/6218; H04L 63/107
USPC ............................................................. 726/8
See application file for complete search history.

(56) References Cited

U.S. PATENT DOCUMENTS

| | | | |
|---|---|---|---|
| 10,419,465 B2 | 9/2019 | Muddu et al. | |
| 11,250,142 B1 | 2/2022 | Wu et al. | |
| 11,669,465 B1 | 6/2023 | Nimry et al. | |
| 12,093,375 B2 | 9/2024 | Endler et al. | |
| 12,125,059 B2 * | 10/2024 | Wright | G06N 3/044 |
| 12,363,171 B1 | 7/2025 | Adams | |
| 12,639,139 B1 * | 5/2026 | Bhat | G06F 9/542 |
| 2006/0088148 A1 * | 4/2006 | Frank | H04W 4/24<br>379/142.01 |
| 2013/0263226 A1 | 10/2013 | Sudia | |
| 2020/0004759 A1 | 1/2020 | Brebner | |
| 2020/0244672 A1 | 7/2020 | Grill et al. | |
| 2020/0304477 A1 | 9/2020 | Venkataraman | |
| 2022/0198562 A1 * | 6/2022 | Cella | G06Q 40/04 |
| 2022/0215111 A1 | 7/2022 | Ekins | |
| 2022/0222356 A1 | 7/2022 | Mack | |
| 2023/0026253 A1 | 1/2023 | Beveridge et al. | |

(Continued)

FOREIGN PATENT DOCUMENTS

WO 2009006728 A9 3/2009

*Primary Examiner* — Dant B Shaifer Harriman
(74) *Attorney, Agent, or Firm* — Banner & Witcoff, Ltd.

(57) ABSTRACT

This disclosure relates to protecting data in a distributed network. Data may be maintained across multiple endpoint devices, where different logical or geographical branches of the network have different data classification ratings that indicate different capabilities and limitations on data transfer and storage. Computer processes provide data governance in the distributed network to manage and transfer data through the network efficiently, provide predictive processing, and prevent unauthorized access to the data through sanitization and manipulation of the data. Artificial intelligence models may be leveraged to monitor data flow in the network and autonomously modify the network or data to enable multiple restricted data sources to be used together in a common workflow efficiently and securely.

17 Claims, 6 Drawing Sheets

(56) References Cited

U.S. PATENT DOCUMENTS

| | | | | |
|---|---|---|---|---|
| 2023/0196136 | A1* | 6/2023 | Campolong ........... G06N 20/00 706/12 | |
| 2023/0245651 | A1* | 8/2023 | Wang ...................... G06F 3/011 704/275 | |
| 2023/0362142 | A1 | 11/2023 | Crabtree et al. | |
| 2024/0176902 | A1 | 5/2024 | Kaidi et al. | |
| 2024/0214381 | A1* | 6/2024 | Pringle ............... H04L 63/0815 | |
| 2025/0029105 | A1* | 1/2025 | Shah ........................ G06N 5/01 | |
| 2025/0390879 | A1 | 12/2025 | Marcus et al. | |

* cited by examiner

DATA GOVERNANCE AI FOR PREDICTIVE DATA RETRIEVAL BASED ON MULTIPLE TRIGGERS

BACKGROUND

Protecting organizational and transactional data (e.g., bank accounts, credit card accounts, website memberships, governmental accounts, etc.) is paramount to avoiding theft of sensitive information, goods, and money. Such data may be maintained across multiple data sources in a distributed network, where different logical or geographical branches of the network have different capabilities and limitations on storing and transferring that data. Accessing the data may occur over an extended duration, where the capabilities and limitations of the network branches may change, and the point of accessing the data may change from one device to another. Accessing the data from multiple restricted sources for use in a common workflow presents issues in providing the data in a timely and secure manner.

SUMMARY

The following summary is intended to provide a simplified understanding of some aspects of the disclosure. It is not a comprehensive overview, nor does it aim to identify key elements or delineate the scope of the disclosure. Instead, it serves as a brief introduction to the concepts discussed in the subsequent description.

Aspects of the disclosure provide effective, efficient, scalable, and convenient technical solutions that address and overcome the technical problems associated with detecting fraud and unauthorized access to multi-user accounts.

In accordance with some aspects, a system and method are provided for predictive data retrieval in a distributed network. The system may comprise a plurality of computer servers coupled to the distributed network. The servers may include processors and memory having data server applications stored therein, wherein the data server applications, when executed by the processors, cause the plurality of computer servers to host a secure account system that provides secure access to a plurality of accounts through multiple diverse interfaces. The data server applications, when executed by the processors, cause the plurality of computer servers to collect information indicative of interactions by a plurality of users with the secure account system via the multiple diverse interfaces, process the information with one or more predictive artificial intelligence models to detect one or more event triggers associated with the interactions, and based on the one or more event triggers, identify a predicted interaction by a specific user with the secure account system. The data server applications, when executed by the processors, may further cause the plurality of computer servers to use one or more generative artificial intelligence models to determine a data process of the secure account system that supports the predicted interaction and execute the data process prior to the specific user initiating the predicted interaction with the secure account system.

The multiple diverse interfaces include a mobile application platform, a website, an automated teller machine, a point of sale terminal, a teller terminal, an automated voice interface, or a bank card terminal.

In some examples, the triggers may include a user moving between locations with different authorization levels for accessing restricted data. In another aspect, the triggers may include a user from a first type of interface initiating and prematurely discontinuing a first action by the secure account system. In another aspect, the triggers may include a failed interaction by the plurality of users with the secure account system.

In some aspects, the predicted interaction may include a user accessing or attempting to access restricted data in a new location, a user accessing or attempting to access restricted data from a second type of interface, or a user performing forensic analysis to detect attempted unauthorized access to an account.

In some aspects, the generated process may include generating a derivative data product from the restricted data but with a different security level, generating or modifying an interface for the user to access the restricted data, or autonomously retrieving account data from multiple restricted data sources, wherein the account data includes identification and transaction information associated with the one account.

These features, along with many others, are discussed in greater detail below.

BRIEF DESCRIPTION OF THE DRAWINGS

The present disclosure is illustrated by way of example and not limited to the accompanying figures in which like reference numerals indicate similar elements and in which.

DETAILED DESCRIPTION

In the following description of various illustrative embodiments, reference is made to the accompanying drawings, which form a part hereof and are shown by illustration of various embodiments in which aspects of the disclosure may be practiced. In some instances, other embodiments may be utilized, and structural and functional modifications may be made without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

By way of introduction, aspects discussed herein relate to protecting organizational and transactional data (e.g., bank accounts, credit card accounts, website memberships, governmental accounts, etc.) to prevent theft of sensitive information, goods, and money. Such data may be maintained across multiple data sources in a distributed network, where different logical or geographical branches of the network have different capabilities and limitations on storing and transferring that data. For example, different network branches may provide different levels of security, be subject to different regulations, have different capabilities and capacities for data storage and transfer, and provide different modes of access by users to the data. Accessing the data may occur over an extended duration, where the capabilities and limitations of the network branches may change, and the point of accessing the data may change from one device to another.

The processes, systems, and methods disclosed herein leverage a combination of the computer processes that provide data governance in a distributed network to manage and transfer data through the network efficiently, provide predictive processing of the data, and prevent unauthorized access to the data through sanitization and manipulation of the data. The processes, systems, and methods may leverage artificial intelligence processes and/or quantum computing capabilities to monitor data flow in the network and autonomously modify the network connections or data to enable multiple restricted sources to be used together in a common workflow efficiently and securely.

Figure 1A:
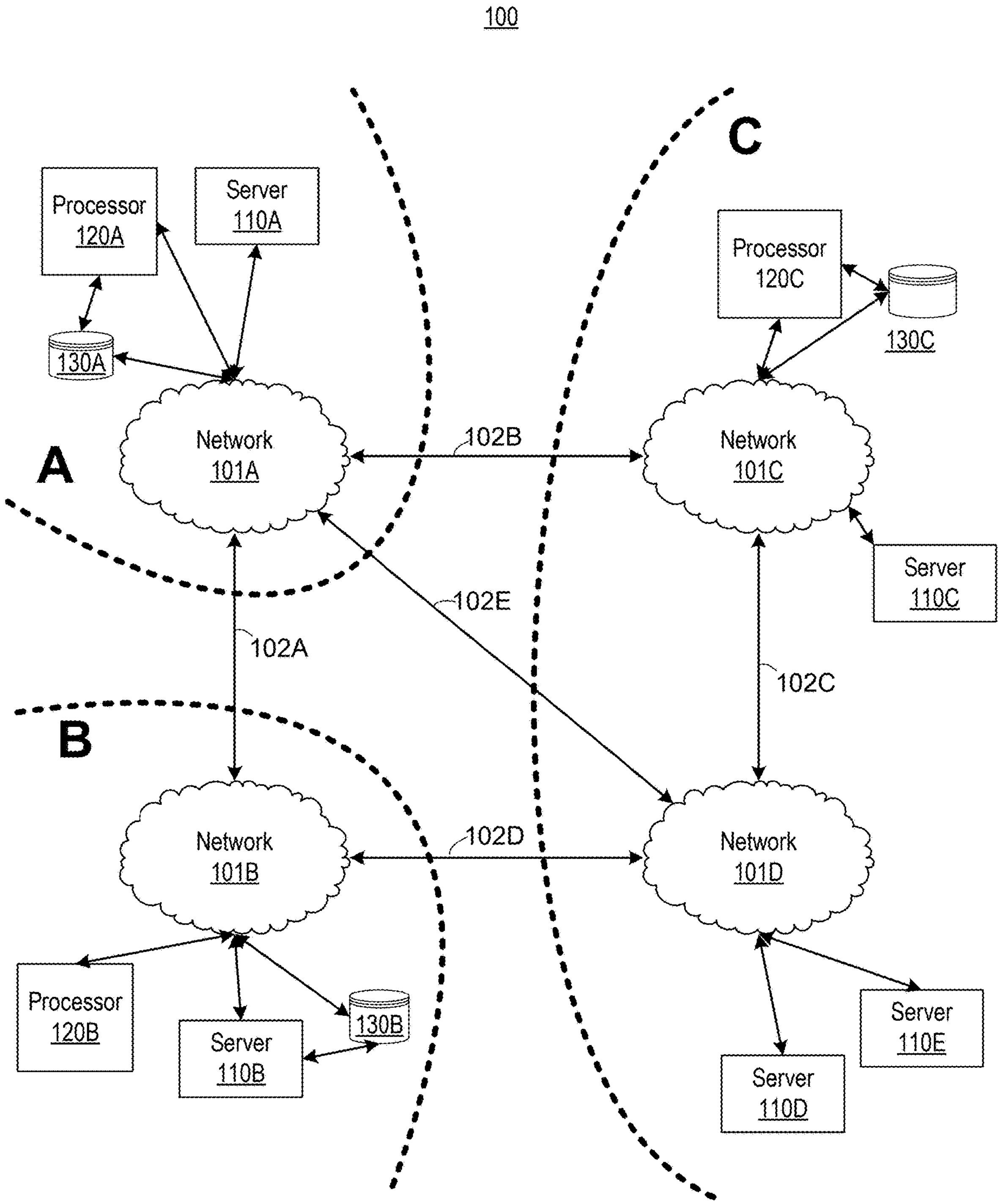
FIGS. 1A-1C depict an illustrative computing environment for implementing a distributed network system in accordance with one or more example embodiments.
Figure 1B:
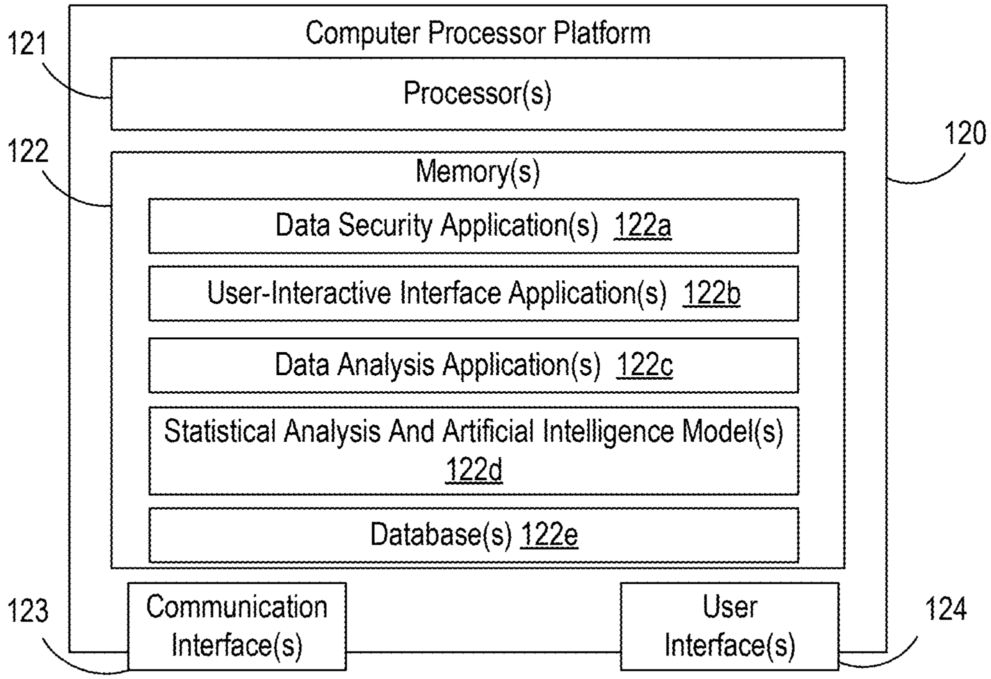
Figure 1C:
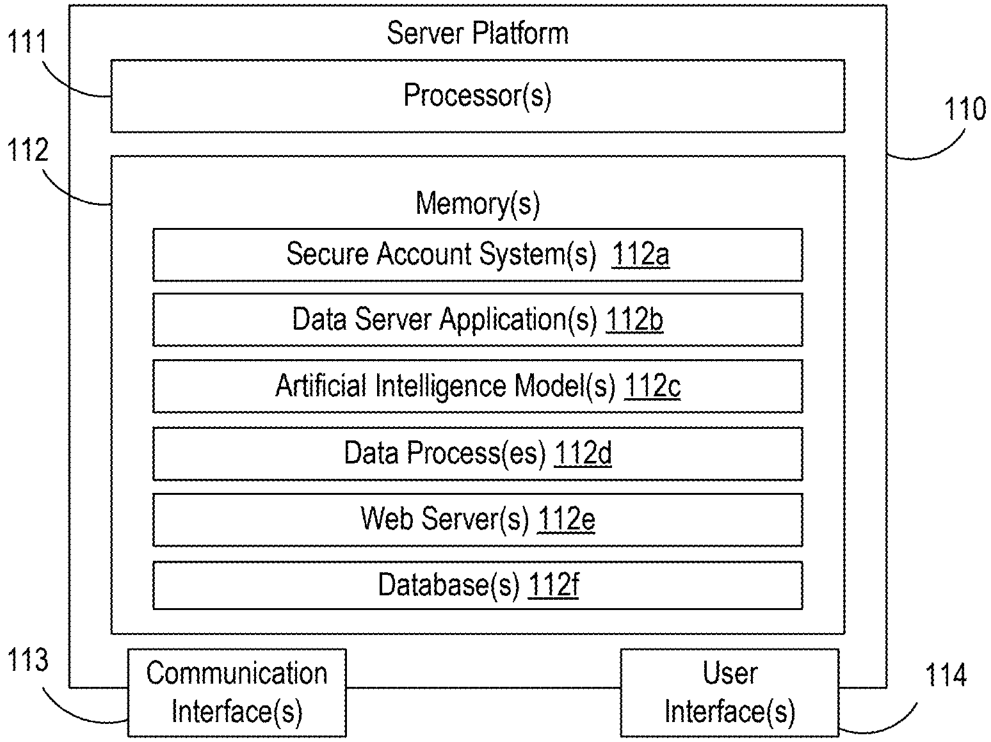

FIGS. 1A-1C depict an illustrative distributed network environment and devices for managing, protecting, and transferring data, such as organizational or transaction data (e.g., bank accounts, credit card accounts, website memberships, governmental accounts, etc.). Referring to FIG. 1A, distributed network environment 100 may include multiple networks (e.g., 101A-101D) distributed across multiple regions (e.g., regions A, B, and C) and connected by one or more communication links (e.g., 102A-102E). In some examples, the regions (e.g., regions A, B, and C) may represent different physical locations (e.g., geographic areas, continents, islands, etc.), governmental or administrative territories (e.g., a country, state, US territory), supranational organization (e.g., European Union), divisions within an enterprise (e.g., company divisions), etc.

Distributed network environment 100 may include one or more computing platforms in each region, interconnected by the plurality of networks (e.g., 101A-101D). Each computing platform (also referred to as an endpoint device) may include one or more servers (e.g., 110A-110E), one or more computer processors (e.g., 120A-120C), and/or one or more network memories (e.g., 130A-130C). Each computing platform (e.g., 110A-110E, 120A-120C, 130A-130C) may be connected to the distributed network environment 100 via a communication link to a network (e.g., 101A-101D) within the same region and/or connected by other communication links to different computing platforms within the region. Although a limited number of servers, network memory, and computers are shown, any number of systems or devices may be used without departing from the disclosure.

Each region may have different capabilities, data formats, rules, regulations, or other technical limitations for storing and transferring data and conducting transactions associated with accounts (e.g., bank accounts, streaming service accounts, company employee accounts, etc.). The capabilities, data formats, rules, regulations, or other technical limitations may differ for transferring data within a region and from region to region. Each network may have a limited connection to another network (e.g., 101B-101C); thus, transferring data between such networks may require transferring data through one or more intermediate networks (e.g., 101A or 101D).

Networks (e.g., 101B-101D) may include a local area network (LAN), a wide area network (WAN), a wireless telecommunications network, digital subscriber line (DSL) networks, frame relay networks, asynchronous transfer mode (ATM) networks, virtual private networks (VPN), and/or any other communication network or combinations thereof. Networks also include associated "network equipment" such as access points, ethernet adaptors (physical and wireless), firewalls, hubs, modems, routers, and/or switches located inside the network and/or on its periphery, as well as software executing on any of the foregoing. The network connections shown are illustrative, and any means of establishing a communications link between the computer platforms may be used. The existence of any of various network protocols, such as TCP/IP, Ethernet, FTP, HTTP, and the like, and of various wireless communication technologies, such as GSM, CDMA, WiFi, and LTE, is presumed. The computing platforms described herein may be configured to communicate using any network protocols or technologies.

Computer processors 120A-120C (also referred to as computers or processors) may be configured to provide a user interface through which a user may perform data processes, transfer data, or conduct a transaction. For example, computer processors 120A-120C may be configured to receive an indication of a request from a user (e.g., card reader initiation of transaction), display one or more user interfaces, provide audio output, receive user input via one or more input devices (e.g., touchscreen, keypad, or the like), receive audio user input, process transactions (e.g., receive deposits, dispense funds, or the like), and the like. Examples of computer processors 120A-120C may include an Automated Teller Machine (ATM), sales or teller terminal, personal computer or laptop within a residence or business (e.g., connected via Wifi), point-of-sale (POS) system, smartphone connected through a cellular network, or other computing device. Computer processors 120A-120C may include back-end machines from which systems hosted on the distributed network may be managed, controlled, or implemented.

Servers (e.g., 110A-110D) (also referred to as data servers and/or computer servers) may receive communications from computer processors (e.g., 120A-120C), for example, that include data transaction requests from computer processors (e.g., 120A-120C), and process those transactions and/or perform other tasks related to data transactions (e.g., such as detecting unauthorized transactions, modifying data links, generating derivative data, etc.). The servers may host web services that provide an interface for users, e.g., to access accounts via computer processors (e.g., 120A-120C).

The servers (e.g., 110A-110D) may further receive multimodal data related to the data transactions, users performing transactions, or systems and/or personnel involved in executing transactions. Such multimodal data may include audio data (e.g., from microphones), video or image data (e.g., from cameras), location data (e.g., from GPS), Internet-of-Things (IOT) data, or other data. The multimodal data may be received from a computer processor (e.g., 120A-120C) from which a data transaction request is received or may be received from different computer processors or devices, such as building security cameras, a personal computing device such as a smartphone, or other devices capable of capturing and transmitting multimodal data to the server. The multimodal data may, for example, indicate the physical actions of users, personnel, or equipment involved in the performance of a transaction related to an account.

Network Memory (e.g., 130A-130C) may include tangible, non-volatile, computer-readable memory that is connected directly to another device, such as a computer processor (e.g., 120A-120C) or a server (e.g.,110A-110D), or connected and accessible by other devices via a network connection (e.g., via a connection to one of networks 101A-101D). Network memory (e.g., 130A-130C) may store and provide access to one or more databases. Such databases may include but are not limited to relational databases, hierarchical databases, distributed databases, in-memory databases, flat file databases, XML databases, NoSQL databases, graph databases, and/or combinations thereof. The data transferred to and from various computer platforms in distributed network environment 100 may include secure and sensitive data, such as account information, confidential documents, and customer personally identifiable information. Data in databases provided in network memory may be stored and transferred in a secure manner using secure network protocols and encryption and/or to protect the integrity of the data when stored on the various computer platforms. For example, a file-based or service-based integration scheme may be utilized to transmit data between the various computer platforms. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. Databases may be distributed across multiple network memories connected through the distributed network environment. They may utilize tamper-proof data structures, such as blockchains (or other linked lists), sidechains (or different lists of linked lists), or directed acyclic graphs, such as tangles or hash graphs. Tamper-proof encoding may alternatively or additionally use lattice-based cryptography, code-based cryptography, and multivariate cryptography. Tamper-proof encoding may include quantum-resistant encryption.

Each of the computing platforms (e.g., 110A-110D, 120A-120C, 130A-130C) may be or include one or more computer components (e.g., server blades, memory, processors, or the like) and may each include systems, applications, and the like, for processing data. Accordingly, each of the computing platforms (e.g., 110A-110D, 120A-120C, 130A-130C) may be a plurality of computing devices in a system for processing data and may communicate with each other via machine-to-machine communication or data exchange to process the data.

FIG. 1B illustrates an example Computer processor platform 120 that may be used to implement each computer processor 120A-120C. Computer processor platform 120 may include one or more processors 121, memory 122, communication interfaces 123, and user interfaces 124 connected via one or more data buses. Communication interface 123 may include a network interface configured to support communication, such as a network 101 or the like. User interface 124 may include a display, speaker, or other device for outputting information to a user and one or more sensor inputs for receiving input from a user. For example, user interface(s) 124 may include a microphone, keypad, touch screen, and/or stylus through which a user of computing device 601 may provide input. It may also include one or more speakers for audio output and a video display device for textual, audiovisual, and/or graphical output. User interface(s) 124 may also include optical scanners (not shown).

Memory 122 may include one or more program modules having instructions that, when executed by processor(s) 121, cause a Computer processor platform 120 to perform one or more functions described herein. Additionally, or alternatively, memory 122 may include one or more databases that may store and/or otherwise maintain information that may be used by such program modules and/or processor(s) 121. In some instances, one or more program modules and/or databases may be stored by and/or maintained in different memory units of Computer processor platform 120 and/or by other computing devices (e.g., network memory 130A-130C) that may form and/or otherwise make up computing platform 120.

For example, memory 122 may have, store, and/or include a data security application 122*a* that may store instructions and/or data that may cause or enable the computer processors (e.g., 120A-120C) to generate data stores, assign data classification ratings to endpoint devices in distributed network 100, assign expiration criteria to data in a data store, provide access to restricted data, and manage the creation, modification, deletion, and transfer of data in distributed network 100.

Computer processor platform 120 may further have, store, and/or include a user-interactive interface application 122*b*. User-interactive interface application 122*b* may store instructions and/or data that may cause or enable the computer processors (e.g., 120A-120C) to operate the user interface 124, such as display a graphical user interface to a user via display or sense input from the user, such as keystrokes on a pin pad or a voice command via a microphone.

Computer processor platform 120 may further have, store, and/or include data analysis application 122*c* that may analyze data stored on and transferred between endpoint devices in the distribution network, and/or generate derivative data products from original or restricted data in the network.

Computer processor platform 120 may further have, store, and/or include one or more statistical analysis and/or artificial intelligence (AI) models 112*d* that may be used by data security application 112*a* and/or data analysis application 112*c* for generating derivative data products, determining security states and data classification ratings for endpoint devices and network connections in distributed network 100, monitor and evaluate data traffic in the network, detect and evaluate security risks in the network, detecting fraud and unauthorized account access, detect data triggers in the network, predict future interactions of users with the network, generate data processes for manipulating data stored and transferred in the network, and/or implement user-interactive agents. The AI model(s) may be trained using previously captured and/or historical data transactions (e.g., user access requests, transaction requests, data transfers) from multi-users and multiple devices, as described below. Some examples include additional data, such as multimodal data collected by UI computing platforms 120 or other computing platforms not having a user interface to train one or more AI models.

Computer processor platform 120 may further have, store, and/or include database 122*e* that may store multimodal data, transferred data, analysis data and/or derivative data received, generated, or processed by the other applications. Computer processors 120A-120C may each include some or all of the components included in computing platform 120, as illustrated and described with respect to FIG. 1B. Each network memory (e.g., 130A-130C) may also include all of the components of computing platform 120, though some network memories may not include all applications (e.g., 122*a*, 122*b*, 122*c*, and 122*d*).

Though not illustrated, computer processor platform 120 may include other components, such as a cash reception and/or distribution system, card reader, or barcode scanner such that the computer processor platform 120 may operate as an ATM, point of sale system, or other system for conducting cash or credit transactions.

FIG. 1C illustrates an example server platform 110 that may be used to implement each server 110A-110C. Server platform 110 may include one or more processor(s) 111, memory 112, communication interface 113, and user interface 114, which are the same or similar to the processor(s) 121, memory 121, communication interface 123, and user interface 124, respectively, described above with respect to FIG. 1B. Memory 112 may include one or more program modules having instructions that, when executed by processor(s) 111, cause a server platform 110 to perform one or more functions described herein. Additionally, or alternatively, memory 112 may include one or more databases 112*f* that may store and/or otherwise maintain information that may be used by such program modules and/or processor(s) 111. In some instances, the one or more program modules and/or databases may be stored by and/or maintained in different memory units of server platform 110 and/or by other server devices (e.g., network memory 110A-110D) that may be connected to, form and/or otherwise make up server platform 110

For example, memory 112 may have, store, and/or include a secure account system 112*a* that maintains and provides secure access to a plurality of accounts through multiple diverse interfaces. The secure account system 112*a* may include company networks, cloud services, database systems, banking networks, etc. Examples of accounts maintained by secure account system 112*a* may include bank accounts, credit card accounts, website memberships, governmental accounts, organizational network login accounts, secure data accounts, etc.

Server platform 110 may further have, store, and/or include one or more data server applications 112*b* that may store instructions and/or data that may cause or enable the servers (e.g., 110A-110D) to host secure account systems (e.g., 112*a*), collect and process information about interactions of users with the network and secure account system, identify data triggers in the information, predict future interactions of users with the network and/or system, and generate and execute processes that support user interaction with the secure account system as further described below.

Server platform 110 may further have, store, and/or include one or more artificial intelligence (AI) models 112*c* that may be used by data server application 112*a*. The AI model 112C may include all or some of the models 122*d* as described above with respect to computer platform 120 and may be trained in the same manner as described above Server platform 110 may further have, store, and/or include one or more data processes 112*d* that may be used for manipulating data stored and transferred in the network, implementing user-interactive agents, generating and modifying user interfaces to the secure account system, modifying data on the network, and/or generating derivative data on the network.

Server platform 110 may further have, store, and/or include one or more web servers 112*e* that may be used (e.g., either directly or via computer platform 120) by users to interact with network or secure account system 112*a*.

Server platform 110 may further have, store, and/or include a database(s) 112*f*, which may store data related to multimodal data, transferred data, modified data, analysis data generated by other applications, and artificial intelligence models stored or executed by server platform 110. Servers 110A-110D may each include some or all of the components in server platform 110, as illustrated and described with respect to FIG. 1C.

Figure 2:
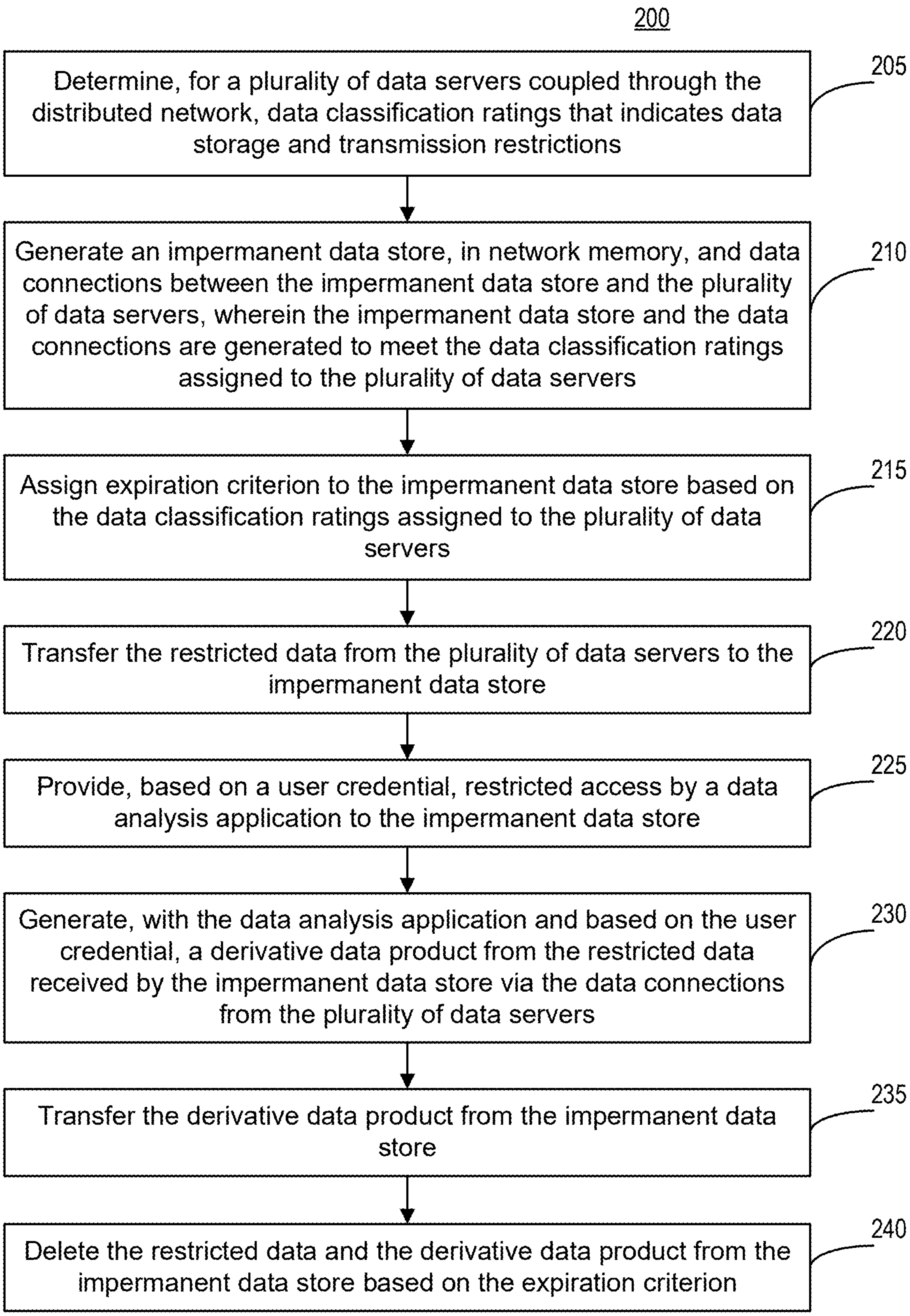
FIG. 2 depicts an illustrative method for predictive data processing in a distributed network in accordance with one or more example embodiments.

FIG. 2 depicts an illustrative process 200 for transferring restricted data between a plurality of data servers (e.g., 110A-110E) coupled through the distributed network. The plurality of data servers may be assigned data classification ratings. Process 200 may be used to dynamically create and manage a restricted data space, referred to as an impermeant data store, where data from multiple restricted data sources can be imported and used in a secure manner with restricted access and on a limited time basis. Process 200 may be carried out by a combination of one or more computer processors (e.g., 120A-120C) and/or one or more data servers (e.g., 110A-110E). For example, process 200 may be performed by at least one processor and memory comprising applications that, when executed, configure the at least one processor to perform the steps of process 200.

In step 205, a computing platform (e.g., 110, 110A-11E, 120, 120A-120C, 130A-130C) may comprise at least one processor and memory comprising a data security application. The data security application, when executed, may configure the at least one processor to determine, for a plurality of data servers coupled through the distributed network, data classification ratings that indicate data storage and transmission restrictions. In some aspects, each data classification rating may determine what data a respective data server of the plurality of data servers may store, transmit, and/or receive. For example, personal identification information such as name, address, birth date, social security number, etc., may have a higher security rating than other information, such as public records, and thus be limited to a more secure data server. As previously described, different regions of the distributed network may have different data storage and transfer capabilities and limitations. The plurality of data servers may be located in multiple regions of the distributed network (e.g., regions A, B, and/or C), and the data classification ratings for the plurality of data servers may be based on which of the multiple regions the plurality of data servers are located (e.g., based on each regions capabilities and limitations).

In step 210, the computing platform (e.g., 110, 110A-11E, 120, 120A-120C, 130A-130C) may have its at least one processor configured by the data security application to generate an impermanent data store and data connections between the impermanent data store and the plurality of data servers. The impermanent data store and the data connections may be generated to meet the data classification ratings assigned to the plurality of data servers. The data store is impermanent because it is temporary or ephemeral and, thus, designed to delete its contents or to be torn down after a limited time or after the use of it is complete.

The impermanent data store may be generated in a memory of the computing platform or in a different device coupled to the distribution network, such as a network memory. For example, step 210 may include the data security application utilizing (e.g., one or more artificial intelligence models) to determine data security states of the multiple different regions and the network branches that connect the regions. Based on the data security states and/or the data classification ratings for the plurality of data servers, the data security application (e.g., utilizing one or more artificial intelligence models) to identify one of the multiple different regions in which to generate the impermanent data store. For example, the region identified may have the highest security limitations (e.g., level of encryption) or most restrictive access limitations (restrictions on authorized users) as compared (e.g., collectively) to the plurality of data servers. The impermanent data store may be generated in the network memory within the identified one of the multiple different regions.

In some aspects, step 210 may include generating the data connections based on real-time monitoring of the distribution network. For example, the at least one processor configured by the data security application may use one or more artificial intelligence models to evaluate real-time states of network branches through the distributed network, and based on the real-time states, generate the data connections from a subset of the network branches to meet the data classification ratings of the plurality of data servers. The at least one processor configured by the data security application may further dynamically modify the data connections based on changes in the real-time states.

Generating and/or modifying the data connections may be based on security considerations. For example, the at least one processor configured by the data security application may detect an unauthorized access to the distributed network based on the changes in the real-time states, and dynamically modify the data connections based on the detected unauthorized access. The at least one processor configured by the data security application may additionally or alternatively evaluate security risk of an unauthorized access to data routed through a plurality of network branches in the distributed network and, based on evaluated security risk, generate the data connections from a subset of the network branches. Detecting an unauthorized access and/or evaluating the security risk of an unauthorized access may include monitoring data requests across the plurality of network branches, processing the monitored data requests (e.g., with an artificial intelligence model) to identify a pattern indicative of a time and a location within the distributed network of the security risk. The data connections may then be generated based on the time and the location (e.g., by avoiding data connections at the location and/or at the time). The location may be a geographical location, or may be a logical or topological location of a branch within the network.

In step 215, the computing platform (e.g., 110, 110A-11E, 120, 120A-120C, 130A-130C) may have its at least one processor configured by the data security application to assign an expiration criterion or criteria to the impermanent data store, for example, based on the data classification ratings assigned to the plurality of data servers. For example, the expiration criterion may include a time limit upon which the impermanent data store, or data within the store expires. other criteria may include real-time levels of security risk detected in the network or location within the network in which the impermanent data store is hosted. Other criteria may be based on use of the data within the impermanent data store.

In step 220, the computing platform (e.g., 110, 110A-11E, 120, 120A-120C, 130A-130C) may have its at least one processor configured by the data security application to transfer the restricted data from the plurality of data servers to the impermanent data store. The derivative data store may categorize the restricted data from different servers based on security or data classification levels. The at least one processor may be configured by the data security application conceal (e.g., for security or access purposes), in the impermanent data store, a least one of the plurality of data servers as a source of the restricted data. For example, the data security application may conceal the source to make the data anonymous (e.g., unassociated with a server, a region, a person, an organization, etc.). In some examples, as part of concealing the source of the data, the data security application may sever one or more of the data connections upon completion of transferring the restricted data to the impermanent data store.

In some examples, in step 220 the computing platform may receive new data. (e.g., data generated over time from one of the data servers or data not previously store in one of the plurality of data servers). The at least one processor may be configured by the data security application to determine (e.g., with an artificial intelligence model) a data classification rating for the new data received by one of the plurality of data servers, and cause or manage the movement of the new data through the distributed network to another of the plurality of data servers based on the data classification rating for the new data. In this way, the impermanent data store may be used migrate data to data servers with the appropriate data classification for the data. For example, the plurality of data servers may be located in multiple different regions of the distributed network, and the data classification rating of the new data may specify region-dependent data location, data transmission, and data storage time restrictions that determine where, how, and when the new data is transferred.

In step 225, the computing platform (e.g., 110, 110A-11E, 120, 120A-120C, 130A-130C) may have its at least one processor configured by the data security application to provide (e.g., based on a user or other access credential) restricted access by a data analysis application to the impermanent data store.

In step 230, the computing platform (e.g., 110, 110A-11E, 120, 120A-120C, 130A-130C) may have its at least one processor configured by the data analysis application to generate a derivative data product from the restricted data received by the impermanent data store via the data connections from the plurality of data servers. The derivative data product may be generated with different data classifications from those of the plurality of servers. For example, the at least one processor may be configured by the data analysis application to receive a request for the derivative data product, wherein the request indicates a data classification that is less restrictive than at least one of the data classification ratings of the plurality of data servers. Based on the request, the at least one processor may be configured by the data analysis application to generate (e.g., using a statistical analysis model or an artificial intelligence model) the derivative data product meeting the data classification rating indicated in the request. In some examples, the derivate data product may be generated using a large language model to produce a summary of the restricted data that meets the data classification rating indicated in the request. In some examples, the derivate data product may be generated by statistical or mathematical analysis to indicate trends in the restricted data or abstract the source of the restricted data.

The derivative data product may comprise multiple data components each with a different derivative data classification rating. In such a case, the at least one processor may be configured by the data security application to store the multiple data components in respective multiple sub-containers within the impermanent data store, and control access to the respective multiple sub-containers based on the different derivative data classification for each of the multiple data components.

In step 235, the computing platform (e.g., 110, 110A-11E, 120, 120A-120C, 130A-130C) may have its at least one processor configured by the data security application to transfer the derivative data product from the impermanent data store, for example, to a user or system that requested the derivative data product. Because the derivative data product has a different classification rating than the restricted data from which it was created, the capabilities and limitations for transferring the derivative data product will be different. For example, a derivative data product that is a summary of the restricted data and/or that has a less restrictive data classification may be transferred to a data server or other endpoint device and/or through network branches that the restricted data could not be transferred to and/or through.

In step 240, the computing platform (e.g., 110, 110A-11E, 120, 120A-120C, 130A-130C) may have its at least one processor configured by the data security application to delete the restricted data and/or the derivative data product from the impermanent data store based on the expiration criterion. For example, where the expiration criterion includes an expiration time limit, the computing platform may delete the restricted data based on the restricted data being stored in the impermeant data store beyond the expiration time limit. In some examples, the impermeant data store is ephemeral such that it is autonomously deleted upon the expiration criterion being met (e.g., upon expiration of a time limit). In some examples, the impermeant data store or the data stored in the impermeant data store is deleted based on (e.g., within a predetermined time after) the transfer of the derivative data product from the impermanent data store.

Figure 3:
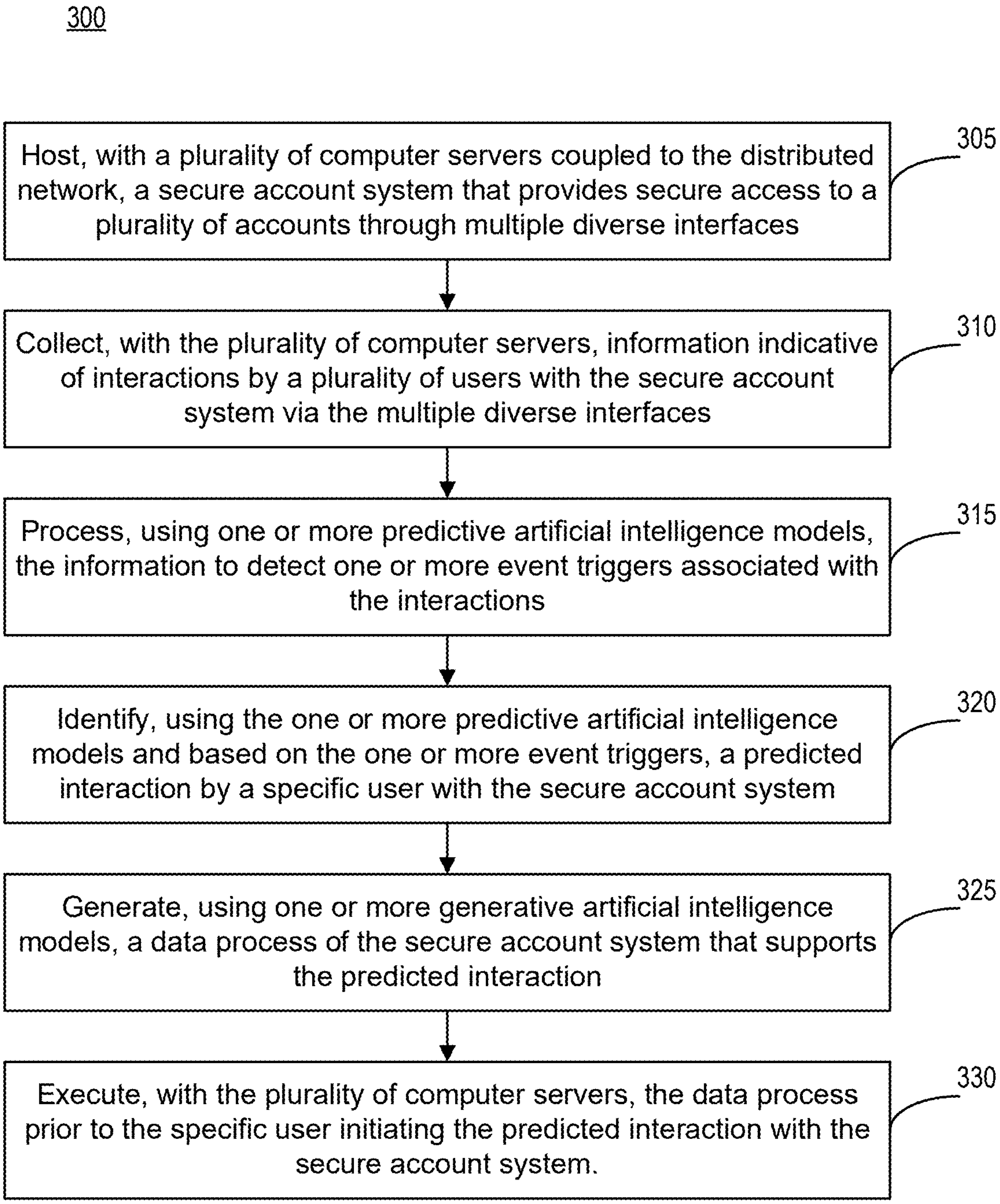
FIG. 3 depicts illustrative methods for detecting unauthorized transactions in a multi-user account in accordance with one or more example embodiments.

FIG. 3 depicts an illustrative process 300 for predictive data processing of data stored and transferred in a distributed network via multiple diverse interfaces. As discussed above with respect to process 200 in FIG. 2, different endpoint devices and branches in the network may have different limitations and capabilities for transferring data in the network. One consequence of this is that transactions and data transfer in the network incur delay because, for example, data classifications need to be considered and managed when transferring data. Process 300 may be used to alleviate the delay and provide a more continuous interaction by a user or group of users with systems and applications (e.g., a secure account system) stored and hosted within the distributed network.

Process 300 may be carried out by a combination of one or more endpoint devices (e.g., 110, 110A-11E, 120, 120A-120C, 130A-130C), such as one or more computer servers (e.g., 110A-110E). For example, process 300 may be performed by endpoint devices having processors and memory comprising applications (e.g., data server applications) that, when executed, configure the processors to perform the steps of process 300.

In step 305, a plurality of endpoint devices (e.g., 110, 110A-11E, 120, 120A-120C, 130A-130C) may have their processors configured by the applications to host a secure account system that provides secure access to a plurality of accounts through multiple diverse interfaces. The secure account system (e.g., 112*a*) may include company networks, cloud services, database systems, banking networks, etc. Examples of accounts maintained by a secure account system may include bank accounts, credit card accounts, website memberships, governmental accounts, organizational network login accounts, secure data accounts, etc. Applications making up the secure account system and data (e.g., account data) maintained by the secure account system may be distributed amongst multiple endpoint devices (e.g., computer processor platforms, server platforms, network memory, etc.).

In step 310, a plurality of endpoint devices (e.g., 110, 110A-11E, 120, 120A-120C, 130A-130C) may have their processors configured by the applications to collect information indicative of interactions by a plurality of users with the secure account system via the multiple diverse interfaces. The multiple diverse interfaces may include interfaces such as a mobile application platform (e.g., a mobile banking application, a mobile shopping application, etc.), a website (e.g., accessed through a computer processor platform 120 having a user interface), an automated teller machine (e.g., a bank ATM allowing users to perform financial transactions), a point of sale terminal, a teller terminal, an automated voice interface (e.g., via a telephone), and a bank card terminal, etc. The plurality of endpoint devices may include collecting multimodal information such as audio data (e.g., from microphones), video or image data (e.g., from cameras), location data (e.g., from GPS), Internet-of-Things (IoT) data, or other data. The multimodal data may be received by endpoint devices with which a user interacts or from different computer processors or devices, such as building security cameras, a personal computing device such as a smartphone, or other devices capable of capturing and transmitting multimodal data to the server. The multimodal data may, for example, indicate the physical actions of users, personnel, or equipment involved in the interaction by a user with the secure account system.

In step 315, a plurality of endpoint devices (e.g., 110, 110A-11E, 120, 120A-120C, 130A-130C) may have their processors configured by the applications to process the information with one or more predictive artificial intelligence models to detect one or more event triggers associated with the interactions. For example, the event triggers may be based on a specific user (or users) interacting with the secure account system or accessing restricted data in one of the plurality of accounts in a specific way, with a specific interface, with specific credentials, from a specific location, at a specific time, in a specific pattern, etc. In some examples, a trigger may include the detection of attempted unauthorized access to the secure account system. In some examples, an event trigger could be based on data being used in a protected space, queues from users accessing the secure account system, or results of algorithms using the data in the protected space. (e.g., based on derivative data products generated in process 200).

In step 320, a plurality of endpoint devices (e.g., 110, 110A-11E, 120, 120A-120C, 130A-130C) may have their processors configured by the applications to identify, based on the one or more event triggers, a predicted interaction by a specific user with the secure account system. For example, a predictive artificial intelligence model may sense when data in region A and data in region B are needed in location.

In step 325, a plurality of endpoint devices (e.g., 110, 110A-11E, 120, 120A-120C, 130A-130C) may have their processors configured by the applications to generate, using one or more generative artificial intelligence models, a data process of the secure account system that supports the predicted interaction. For example, the generated process may pre-fetch restricted data from different regions (e.g., regions A and B) of the distributed network based on an anticipated need for the data in another region (e.g., region C).

In step 330, a plurality of endpoint devices (e.g., 110, 110A-11E, 120, 120A-120C, 130A-130C) may have their processors configured by the applications to execute the data process prior to the specific user initiating the predicted interaction with the secure account system. By executing the process potentially before the predicted interaction, the delay may be reduced, and the speed at which the secure account system responds to a user may be increased.

In one example, the interactions by the plurality of users (e.g., in step 310) may comprise a specific user (or users) accessing restricted data in one account of the plurality of accounts, wherein the specific user is in a first location, and the accessing is authorized by the secure account system based on the specific user being in the first location. The one or more triggers (e.g., in step 315) may comprise the specific user moving to a second location of the distributed network. Based on this or another trigger, the predicted action may include the specific user attempting to access the account from the second location. The data process (e.g., in step 325) may include an application for generating a derivative data product from the restricted data. For example, the secure account system may assign a more restrictive security level to the first location than the second location. Thus, the access to the restricted data for endpoint devices in the second location may not be authorized. Based on the different security levels, the data process may generate a derivative data product such that the secure account system would authorize its access in the second location. The first and second locations may include different geographic locations, or may be different logical or topographical network branches in the distributed network. The monitored information (e.g., in step 310) may include GPS information or network address information associated with the first location and the second location. While the collected information, interactions, triggers, predicted interaction, and data process are presented in this example as being used together, each of these elements may be used in other examples of process 300 that lack any one or all other elements that are presented.

In another example of process 300, the one or more event triggers (e.g., in step 315) may include a specific user (or users) initiating a first action by the secure account system via a first type of interface of the multiple diverse interfaces, but then prematurely discontinuing a first action. For example, the first action may include a user having an account on the secure account system initiating a loan application via an automated telephone interface (e.g., a first type of interface). The user, however, may terminate the action because the user didn't have everything needed (e.g., proof of identification information) to complete the action. The predicted interaction may include the user later accessing the secure account system via a second type of interface, such as a mobile application or website. The generated data process (e.g., in step 325) may include modifying the second type of interface to complete the first action. For example, the data process may include programming an automated artificial intelligence agent to provide, in response to the specific user accessing the second type of interface, a sequence of prompts for completing the first action. The prompts may be tailored to the specific user based on information already known about the user and based on which parts of the first action were completed. In some examples, the data process may comprise retrieving and pre-buffering secure data from one or more secure databases, that would be required to complete the first action. This retrieving of data may include one or more steps of process 200.

In another example, the one or more event triggers (e.g., in step 315) may include a failed interaction by one or more users with the secure account system. The system may construe the failed interaction (e.g., by an artificial intelligence model) as an attempted unauthorized access to the secure account system. Based on the failed interaction, the predicted interaction (e.g., in step 320) may include a specific user (e.g., a security professional) initiating a forensic analysis to detect an attempted unauthorized access to one account of the plurality of accounts. The generated data process (e.g., in step 325) may include one or more applications that autonomously retrieve account data and/or network traffic data from multiple restricted data sources, wherein the account data includes identification and transaction information associated with the one account. The data retrieval may include one or more steps of process 200.

Some examples may include the system (e.g., using an artificial intelligence model) to collect interaction information from a particular user in step 310 (e.g., a user ordering a checkbook in a bank) and detect in step 315 that there may be more efficient way for the customer to have the same interactions. The system may predict in step 320 that the user will access the system via a mobile application, and in step 325, modify the functionality of the user's mobile application to autonomously prompt/teach the user how to perform the same interaction via the mobile application.

In other examples, a user may not know what information is necessary to use a service of the secure account system, such as applying for a mortgage. Process 300 may predict, e.g., based on the user's past browsing history, that the user might use the service (e.g., apply for a mortgage), and based on this prediction, generate processes that collect all information (e.g., using process 200) about the user that the system has and will be necessary (e.g., identification information, credit history, account information), and pre-generates a data package for the user to use the service. For example, the data package may include a summary of the necessary information that the system already has and additional information that will be needed from the user.

Figure 4:
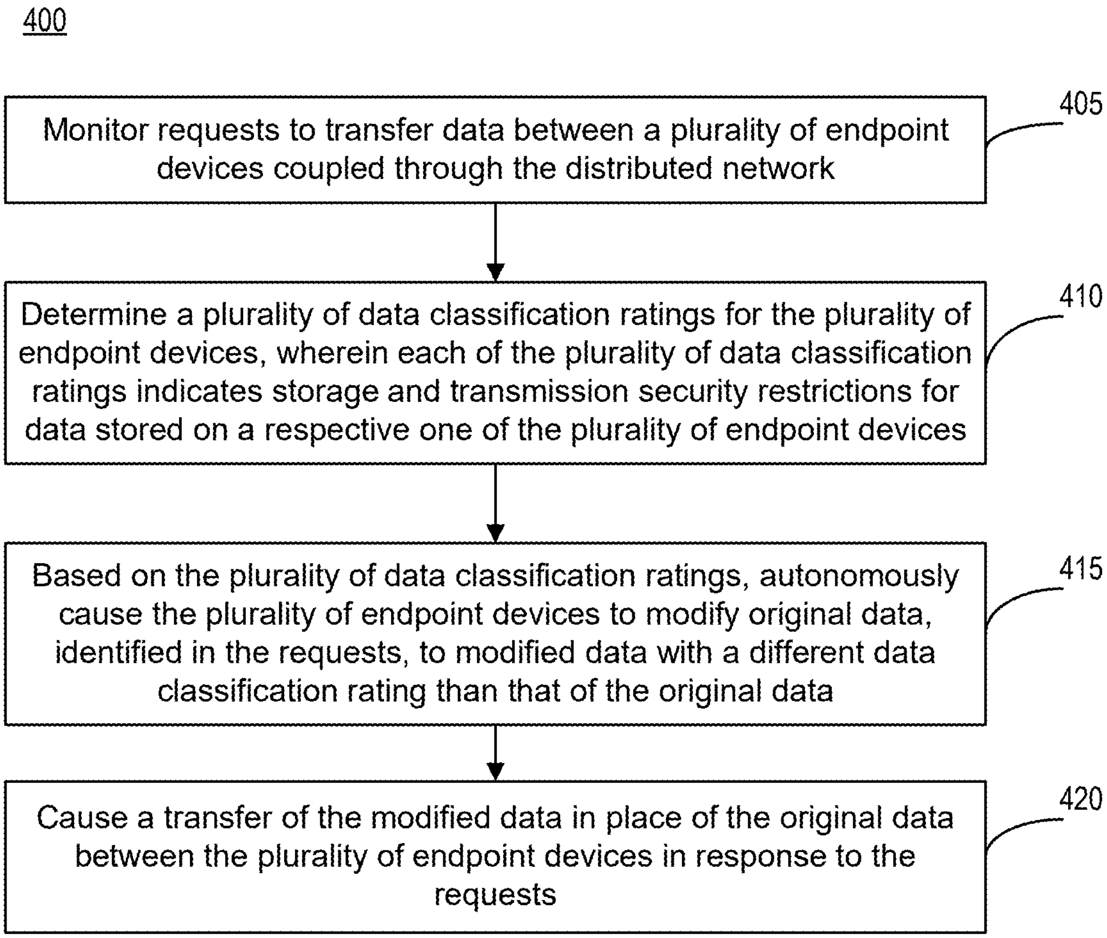
FIG. 4 depicts an illustrative method of sanitizing restricted data transmitted through a distributed network in accordance with one or more example embodiments.

FIG. 4 depicts an illustrative process 400 for sanitizing restricted data transmitted through a distributed network. As discussed above with respect to process 200 in FIG. 2 and process 300 in FIG. 3, data transferred through different network branches and storage in different endpoint devices may be subject to different capabilities and restrictions (e.g., security levels), and users (e.g., bad actors) may attempt access data on the network without proper authorization. Process 400 may be used to manage data transfer in the network in accordance with the restrictions and address security risks of attempted unauthorized access to data.

Process 400 may be carried out by a combination of endpoint devices (e.g., 110, 110A-11E, 120, 120A-120C, 130A-130C) in the distributed network. For example, one or more computer processors (e.g., 120A-120C) and/or one or more data servers (e.g., 110A-110E) may include at least one processor and memory comprising applications (e.g., a data security application) that, when executed, configure the at least one processor to perform the steps of process 200, including controlling other endpoint devices to perform certain steps.

In step 405, at least one processor and memory comprising a data security application that, when executed, may configure the at least one processor to monitor requests to transfer data between the plurality of endpoint devices. The at least one processor and memory may be comprised in one or more computing platforms (e.g., 110, 110A-11E, 120, 120A-120C, 130A-130C). For example, the at least one processor and the memory may comprise multiple processors and multiple memory located in multiple different geographic regions of the distributed network.

The requests may be generated at endpoint devices, for example, by users via a user interface (e.g., a transaction request received at an ATM) or by autonomous processes (e.g., by process 300 of FIG. 3). The monitoring may be carried out using one or more centralized or distributed artificial intelligence models hosted in the distributed network. The requests may be exchanged directly between any two endpoint devices in the distributed network, or the requests may be from the endpoint devices in the network, to a central device, such as a server hosting a secure account system.

Step 405 may include receiving and monitoring multimodal data from other devices that are communicatively coupled to the distributed network. For example, one or more sensors may be coupled to the network (e.g., via an endpoint device) and include a microphone for sensing sound in the proximity of an endpoint device or network branch, a camera (e.g., visible or infrared light camera) for capturing an image or video of the area proximate to an endpoint device or network branch, a fingerprint reader for capturing a person's fingerprints, a retina scanner for capturing a person's retina data, LIDAR for capturing motion (e.g., movement of people or cars, or biometric data such as breadth rate), GPS or wireless RF transceiver for capturing a location or motion of an endpoint device (e.g., coupled wirelessly), or other sensors (e.g., IoT sensors, light sensors) capable of capturing the physical movement or presence of persons in the proximity to an endpoint device or network branch. In some examples, the sensors are comprised in a user-interactive interfaces such that the multimodal data is received via the user-interactive interfaces. The multimodal data may be indicative of actions by a user of the distributed network. A user may include an authorized user (e.g., with security credentials to access data on the network) or may be another person, such as a person attempting to commit fraud or otherwise conduct an unauthorized transaction. In some examples, the physical actions or movement of more than one person or user may be sensed at a single UI computer.

In some examples in step 405, the data security application may (e.g., using one or more artificial intelligence models) be configured to dynamically and/or autonomously evaluate security levels of data connections through the distributed network between the plurality of endpoint devices. For example, the data security application (e.g., utilizing one or more artificial intelligence models) may be configured to monitor, in real-time, data traffic (e.g., the data transfer requests) in the distributed network and/or the multimodal data, and evaluate the data traffic to identify a security risk of unauthorized access to original data stored in an endpoint device or transferred between endpoint devices. In some examples, the monitoring includes detecting a pattern (or patterns) in the data traffic and/or multimodal data, which is indicative of the unauthorized access occurring via one endpoint device of the plurality of endpoint devices. For example, the monitoring may identify a pattern indicative of a time and a location (e.g., a geographical location) within the distributed network of unauthorized access or other security risk.

In step 410, the at least one processor may be configured by the data security application to determine a plurality of data classification ratings for the plurality of endpoint devices, wherein each of the plurality of data classification ratings indicates storage and transmission security restrictions for data stored on a respective one of the plurality of endpoint devices. The plurality of data classification ratings may be based on where the plurality of endpoint devices are located in the distributed network's multiple geographic regions (e.g., regions A, B, and C). For example, some regions may have a less restrictive or less secure data classification rating, wherein other regions may have more restrictive or more secure data classification ratings. In some examples, the plurality of data classification ratings may be based on a security risk or unauthorized access that is identified in step 405.

In step 415, the at least one processor may be configured by the data security application to, based on the plurality of data classification ratings, cause the plurality of endpoint devices to modify original data, identified in the requests of step 405, to modified data with a different data classification rating than that of the original data. For example, the system may modify the original data to allow it to be transmitted to different endpoint devices or regions within the network, which have a different data classification from that of the endpoint device that is the original data source. For example, the data security application may configure the at least one application to cause the plurality of endpoint devices to generate the modified data using a large language model to produce a summary of the original data. The modified data, including the summary, may meet a less restrictive data classification rating than that of the original data, for example, because specific details in the original data may be obfuscated, generalized, or not included in the summary.

In some examples, the data may be modified to increase the security of the data. For example, the at least one processor may be configured by the data security application to cause the plurality of endpoint devices to modify the original data to the modified data based on the security levels of the data connections between the endpoint devices (e.g., that are dynamically and/or autonomously evaluated and determined in step 410).

According to another aspect, the data security application may configure the at least one processor to cause the plurality of endpoint devices to conceal a first endpoint device as a source of the original data. For example, to conceal the first endpoint device as the source of the original data, the at least one processor may be configured by the data security application to identify (e.g., in the transfer of the modified data) a second endpoint device of the plurality of endpoint devices as the source of the modified data, wherein the second endpoint device is different from the first endpoint device.

In some examples, the data security application may configure the at least one processor to cause the plurality of endpoint devices to modify the original data to the modified data based on a change in the plurality of data classification ratings. For example, two endpoint devices may exchange original data at a first data classification rating, but based on a detected security breach or threat or a network branch of the distributed network between the two endpoint devices, may thereafter modify the original data to modified data that meets a second data classification rating that corresponds to the security breach or threat.

In some aspects of step 415, the modified data may include false data or additional data, for example, to mislead a receiver of the data, or make the data traceable if used by a receiver of the data.

For instance, in some aspects, the modified data may include or resemble the original data, but have specific instances of data that are changed. For example, if the original data includes personal information about an account holder, the personal data may include manipulated social security numbers, account numbers, passwords, addresses, dates of birth, etc. In another example, if the original data is financial information (e.g., of a company), the modified data may include manipulated values or statistics in the original data. In some examples, the modified data may include a summary of the original data, but includes false information that mischaracterizes the original data. In some aspects, the modified data may include a copy of the original data or a subset of the original data, but with a watermark added so that the copy of the original data may be traced or associated with the specific exchange.

In some aspects, the modified data may include an application or may be formatted (e.g., in HyperText Markup Language (HTML) or extendible markup language (XML))

that provides a user interface, such as a website. The original data may represent an original website or application (e.g., a transactional website), and the modified data may represent a modified website or application that emulates the original website or application. The modified website or application may be designed such that the receiver cannot distinguish it from the original website. In some examples, the original website or application may provide access to a secured account, and the modified website or application may provide access to an emulated account. The modified website or application may be isolated from the secure account. The modified website or application may be interactive and provide prompts to a user for information (e.g., that may identify or be correlated to the user of the modified website or application. In some examples, the modified data includes a virtualized operating system accessible via the one endpoint device, which is isolated from the original data (e.g., on a different endpoint device).

In step 420, the at least one processor may be configured by the data security application to cause a transfer of the modified data in place of the original data between the plurality of endpoint devices in response to the requests. In some examples, the transfer of the modified data can be directed to a particular endpoint device based on the monitoring. For instance, if in step 405, if a pattern of data requests and/or modified data is identified that indicates a time and/or a location (e.g., a geographical location) within the distributed network of an unauthorized access, the modified data may be transferred to an endpoint device when and/or where the unauthorized access is indicated. In some examples, where a request for data indicates that the data should be transmitted to multiple endpoint devices (e.g., in different geographic locations), modified data may be sent in response to the request to one endpoint device (e.g., in a first location where a security risk is identified) and original data may be sent in response to the request to another endpoint device (e.g., in a second location where no security risk is identified).

Each of the steps or process 400 may be partially or entirely autonomous, e.g., using artificial models and/or quantum computing computers. For example, one or more application engines may be hosted on one or more computing platforms coupled to the distributed network that continuously monitors the network for data requests and/or multimodal data, determines and/or continuously updates data classification rating based on the monitoring (e.g., potential detecting security threats), and controls the endpoint devices to dynamically modify original data. These steps may be performed in real-time, such that modified data (e.g., a modified website or modified account information) may be sent in response to a data request, for example, such that the requester receives the modified data within a duration that the original data would have been expected.

Figure 5:
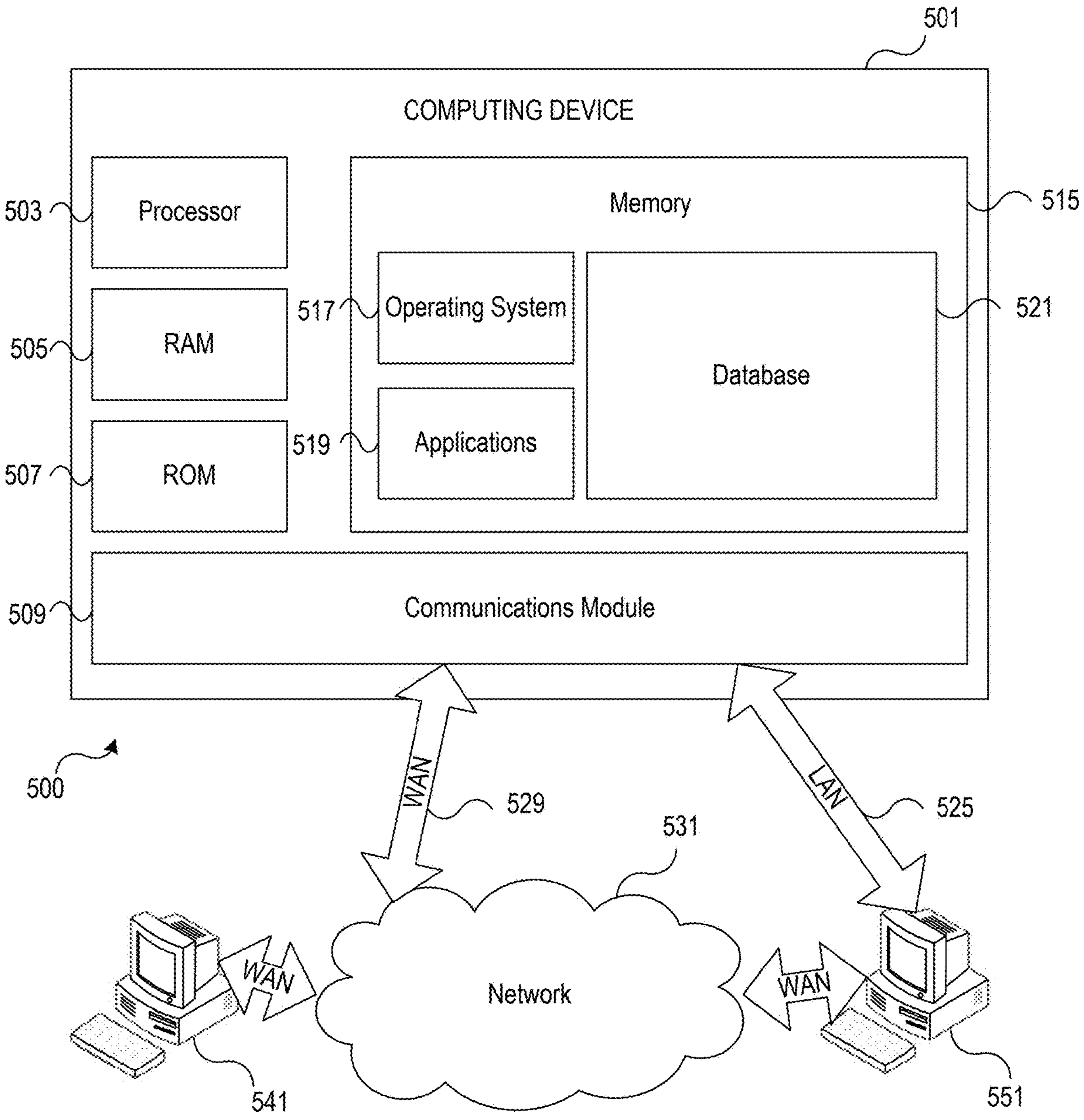
FIG. 5 illustrates one example environment in which various aspects may be implemented in accordance with one or more aspects described herein.

FIG. 5 depicts an illustrative operating environment in which various aspects of the present disclosure may be implemented in accordance with one or more example embodiments. Computing System Environment 500 is only one example of a suitable computing environment. It is not intended to suggest any limitation regarding the scope of use or functionality contained in the disclosure. Computing System Environment 500 should not be interpreted as having any dependency or requirement relating to any one or combination of components shown in illustrative Computing System Environment 500. Computing System Environment 500 elements for implementing any of the computing platforms (e.g., 101A-101D, 102A-102E, 110, 110A-110D, 120, 120A-120C, and/or 130A-130C) in addition or as an alternative to those elements as described above with respect to FIGS. 1A-1C.

Computing system environment 500 may include processor 503 for controlling the overall operation of computing device 501 and its associated components, including Random Access Memory (RAM) 505, Read-Only Memory (ROM) 507, communications module 509, and memory 515. Computing device 501 may include a variety of computer-readable media. Computer-readable media may be any available media that may be accessed by computing device 501, may be non-transitory, and may include volatile and nonvolatile, removable and non-removable media implemented in any method or technology for storage of information such as computer-readable instructions, object code, data structures, program modules, or other data. Examples of computer-readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor (e.g., hardware processor) on computing device 501. Such a processor may execute computer-executable instructions stored on a computer-readable medium.

Software may be stored within memory 515 and/or storage to provide instructions to processor 503 for enabling computing device 501 to perform various functions as discussed herein. For example, memory 515 may store software used by computing device 501, such as operating system 517, application programs 519, and associated database 521. Also, some or all of the computer-executable instructions for computing device 501 may be embodied in hardware or firmware. Although not shown, RAM 505 may include one or more applications representing the application data stored in RAM 505 while computing device 501 is on and corresponding software applications (e.g., software tasks) are running on computing device 501.

Communications module 509 may include a microphone, keypad, touch screen, and/or stylus through which a user of computing device 501 may provide input. It may also include one or more speakers for audio output and a video display device for textual, audiovisual, and/or graphical output. Computing system environment 500 may also include optical scanners (not shown).

Computing device 501 may operate in a networked environment supporting connections to one or more remote computing devices, such as 541 and 551. Computing devices 541 and 551 may be personal computing devices or servers that include any or all of the elements described above relative to computing device 501.

The network connections depicted in FIG. 5 may include Local Area Network (LAN) 525 and Wide Area Network (WAN) 529, as well as other networks. When used in a LAN networking environment, computing device 501 may be connected to LAN 525 through a network interface or adapter in communications module 509. When used in a WAN networking environment, computing device 501 may include a modem in communications module 509 or other means for establishing communications over WAN 529, such as network 531 (e.g., public network, private network, Internet, intranet, and the like). The network connections shown are illustrative, and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP), and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smartphones, multiprocessor systems, microprocessor-based systems, set-top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, etc. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to implement one or more aspects of the disclosure more effectively, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events described herein may be transferred between a source and a destination in light or electromagnetic waves traveling through signal-conducting media such as metal wires, optical fibers, or wireless transmission media (e.g., air or space). In general, one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the single computing platform may perform the various functions of each computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system for predictive data processing in a distributed network, the system comprising a plurality of computer servers coupled to the distributed network and comprising processors and memory having data server applications stored therein, wherein the data server applications, when executed by the processors, cause the plurality of computer servers to:

host a secure account system that provides secure access to a plurality of accounts through multiple diverse interfaces;

collect information indicative of interactions by a plurality of users with the secure account system via the multiple diverse interfaces, wherein the interactions by the plurality of users comprise a specific user accessing restricted data in one of the plurality of accounts, wherein the accessing of the restricted data is authorized by the secure account system based on the specific user being in a first location;

process the information with one or more predictive artificial intelligence models to detect one or more event triggers associated with the interactions, wherein the one or more event triggers comprise the specific user moving to a second location of the distributed network;

identify, based on the one or more event triggers, a predicted interaction by-a-the specific user with the secure account system, wherein the predicted interaction comprises the specific user accessing a derivative data product, wherein the accessing of the derivative data product is authorized by the secure account system based on the specific user being in the second location;

generate, using one or more generative artificial intelligence models, a data process of the secure account system that supports the predicted interaction, wherein the data process comprises generating the derivative data product from the restricted data; and execute the data process prior to the specific user initiating the predicted interaction with the secure account system.

2. The system of claim 1, wherein the multiple diverse interfaces include at least one of: a mobile application platform, a website, an automated teller machine, a point of sale terminal, a teller terminal, an automated voice interface, and a bank card terminal.

3. The system of claim 1, wherein the data server applications, when executed by the processors, causes the secure account system to assign a more restrictive security level to the first location than the second location.

4. The system of claim 3, wherein the first location and the second location comprise different network branches in the distributed network.

5. The system of claim 3, wherein the information includes GPS information or network address information associated with the first location and the second location.

6. The system of claim 1, wherein:

the one or more event triggers comprise the specific user initiating and prematurely discontinuing a first action by the secure account system via a first type of interface of the multiple diverse interfaces;

the predicted interaction comprises the specific user accessing the secure account system via a second type of interface of the multiple diverse interfaces; and the data process comprises modifying the second type of interface to complete the first action.

7. The system of claim 6, wherein:

the second type of interface comprises a mobile application platform or a website; and the data process comprises programming an automated artificial intelligence agent to provide, in response to the specific user accessing the second type of interface, a sequence of prompts for completing the first action.

8. The system of claim 1, wherein:

the one or more event triggers comprise a failed interaction by the plurality of users with the secure account system;

the predicted interaction comprises the specific user initiating a forensic analysis to detect an attempted unauthorized access to one account of the plurality of accounts; and the data process comprises autonomously retrieving account data from multiple restricted data sources, wherein the account data includes identification and transaction information associated with the one account.

9. A method for a predictive data process in a distributed network, the method comprising:

hosting, with a plurality of computer servers coupled to the distributed network, a secure account system that provides secure access to a plurality of accounts through multiple diverse interfaces;

collecting, with the plurality of computer servers, information indicative of interactions by a plurality of users with the secure account system via the multiple diverse interfaces, wherein the interactions by the plurality of users comprise a specific user accessing restricted data in one of the plurality of accounts, wherein the accessing of the restricted data is authorized by the secure account system based on the specific user being in a first location;

processing, using one or more predictive artificial intelligence models, the information to detect one or more event triggers associated with the interactions, wherein the one or more event triggers comprise the specific user moving to a second location of the distributed network;

identifying, using the one or more predictive artificial intelligence models and based on the one or more event triggers, a predicted interaction by a the specific user with the secure account system, wherein the predicted interaction comprises the specific user accessing a derivative data product, wherein the accessing of the derivative data product is authorized by the secure account system based on the specific user being in the second location;

generating, using one or more generative artificial intelligence models, a data process of the secure account system that supports the predicted interaction, wherein the data process comprises generating the derivative data product from the restricted data; and executing, with the plurality of computer servers, the data process prior to the specific user initiating the predicted interaction with the secure account system.

10. The method of claim 9, wherein the multiple diverse interfaces include at least one of: a mobile application platform, a website, an automated teller machine, a point of sale terminal, a teller terminal, an automated voice interface, and a bank card terminal.

11. The method of claim 9, further comprising:

assigning, using the secure account system, a more restrictive security level to the first location than the second location.

12. The method of claim 9, wherein the first location and the second location comprise different network branches in the distributed network.

13. The method of claim 9, wherein the information includes GPS information or network address information associated with the first location and the second location.

14. The method of claim 9, wherein:

the one or more event triggers comprise the specific user initiating and prematurely discontinuing a first action by the secure account system via a first type of interface of the multiple diverse interfaces;

the predicted interaction comprises the specific user accessing the secure account system via a second type of interface of the multiple diverse interfaces; and the data process comprises modifying the second type of interface to complete the first action.

15. The method of claim 14, wherein:

the second type of interface comprises a mobile application platform or a website; and the data process comprises programming an automated artificial intelligence agent to provide, in response to the specific user accessing the second type of interface, a sequence of prompts for completing the first action.

16. The method of claim 9, wherein:

the one or more event triggers comprise a failed interaction by the plurality of users with the secure account system;

the predicted interaction comprises the specific user initiating a forensic analysis to detect an attempted unauthorized access to one account of the plurality of accounts; and the data process comprises autonomously retrieving account data from multiple restricted data sources, wherein the account data includes identification and transaction information associated with the one account.

17. A system for predictive data processing in a distributed network, the system comprising at least one processor and memory having computer executable instructions stored therein, wherein the instructions, when executed by the at least one processor, cause the at least one processor to:

collect information indicative of interactions of a plurality of users with a secure account system via multiple diverse interfaces, wherein the secure account system provides secure access to a plurality of accounts through the multiple diverse interfaces and is hosted in the distributed network by one or more computer servers, and wherein the interactions by the plurality of users comprise a specific user accessing restricted data in one of the plurality of accounts, wherein the accessing of the restricted data is authorized by the secure account system based on the specific user being in a first location;

process the information with one or more predictive artificial intelligence models to detect one or more event triggers associated with the interactions, wherein the one or more event triggers comprise the specific user moving to a second location of the distributed network;

identify, based on the one or more event triggers, a predicted interaction by a the specific user with the secure account system, wherein the predicted interaction comprises the specific user accessing a derivative data product, wherein the accessing of the derivative data product is authorized by the secure account system based on the specific user being in the second location;

generate, using one or more generative artificial intelligence models, a data process of the secure account system that supports the predicted interaction, wherein the data process comprises generating the derivative data product from the restricted data; and cause the data process to be executed by the secure account system prior to the specific user initiating the predicted interaction with the secure account system.

* * * * *